Jan. 22, 1963
F. S. AJERO
3,074,569
SIDE-LOAD AND UNLOAD STRUCTURE FOR
RAILWAY-CARRIED HIGHWAY TRAILERS
Filed Jan. 28, 1959
4 Sheets-Sheet 1
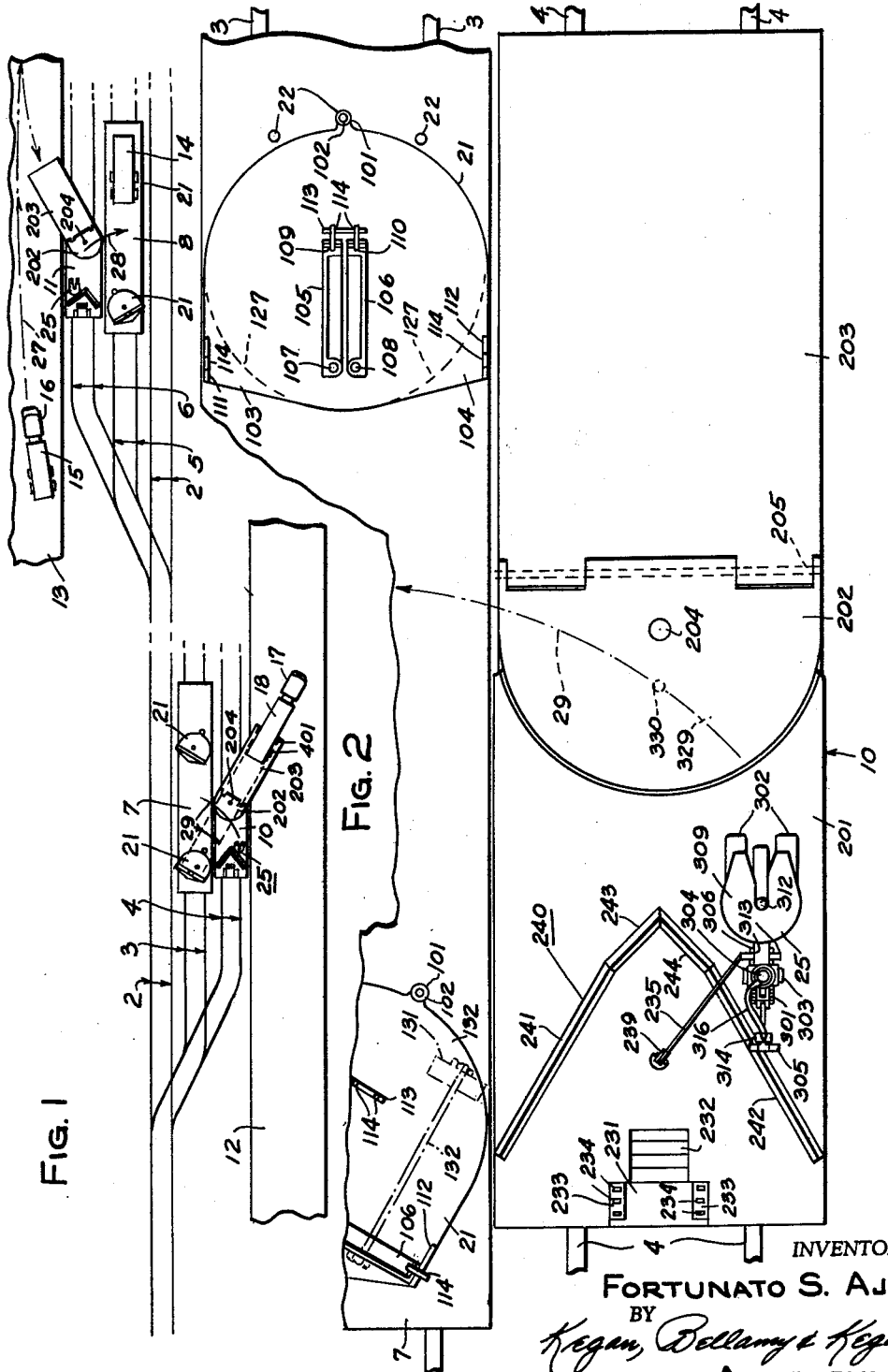
INVENTOR.
FORTUNATO S. AJERO
BY
Kegan, Bellamy & Kegan
ATTORNEYS

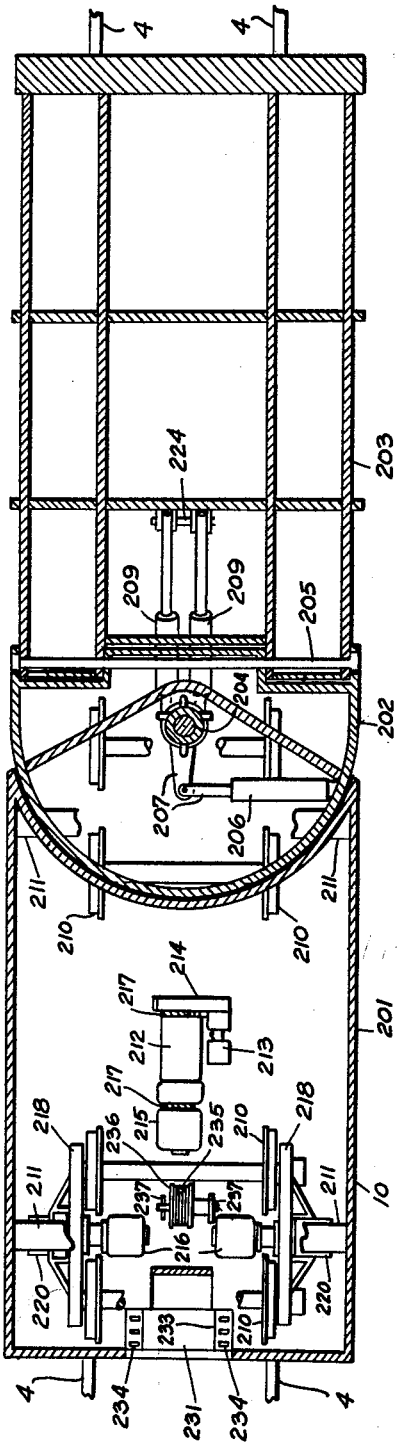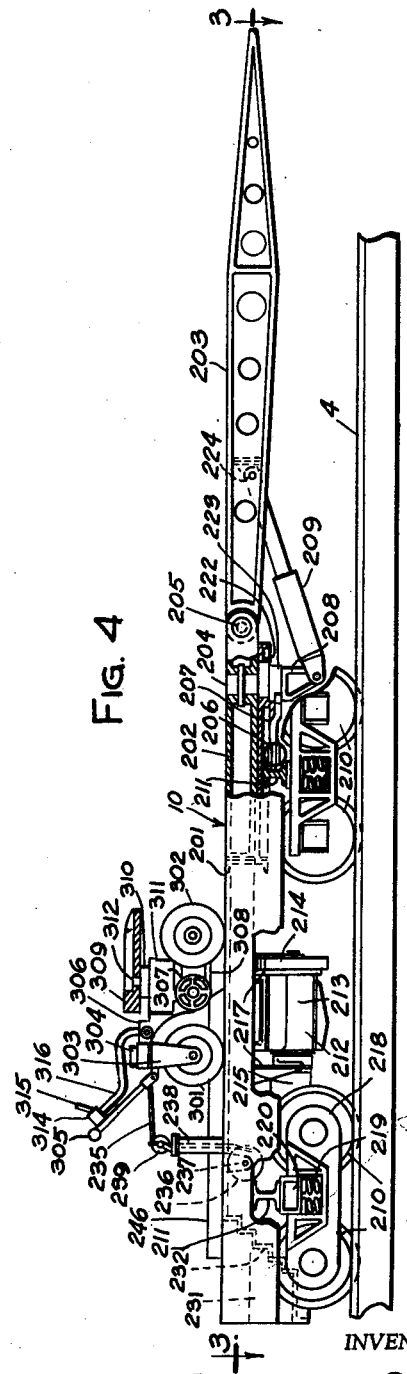
INVENTOR.
FORTUNATO S. AJERO
BY
Kegan, Bellamy & Kegan
ATTORNEYS

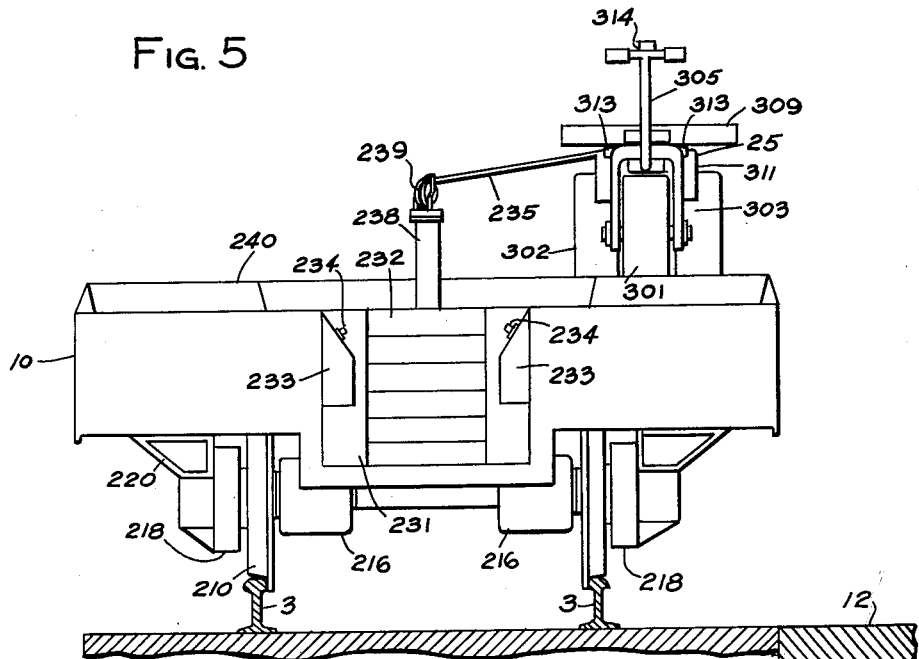
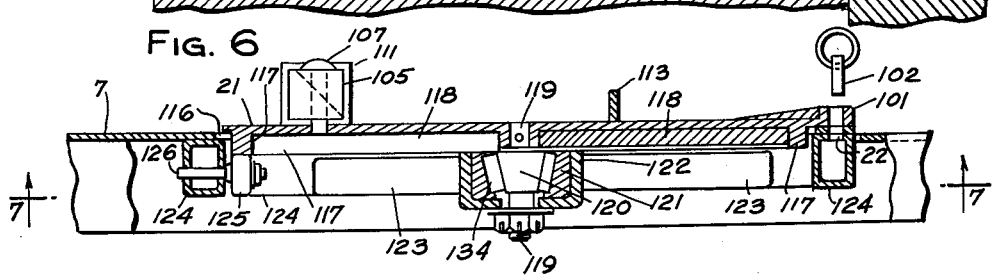
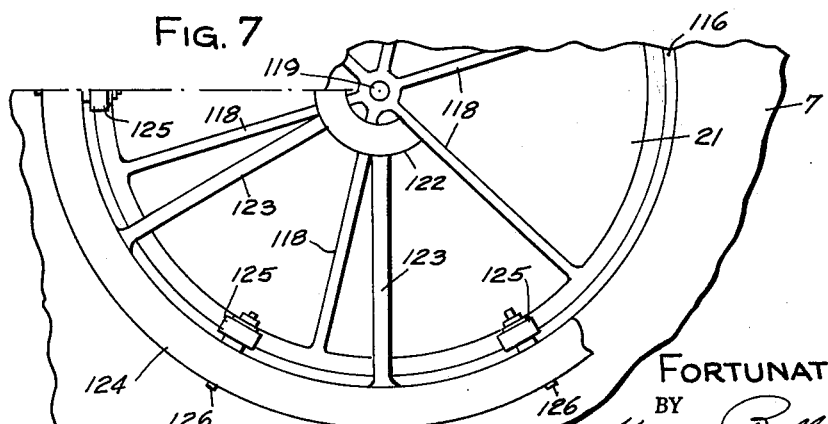
INVENTOR.
FORTUNATO S. AJERO

Jan. 22, 1963
F. S. AJERO
3,074,569
SIDE-LOAD AND UNLOAD STRUCTURE FOR
RAILWAY-CARRIED HIGHWAY TRAILERS
Filed Jan. 28, 1959
4 Sheets-Sheet 4
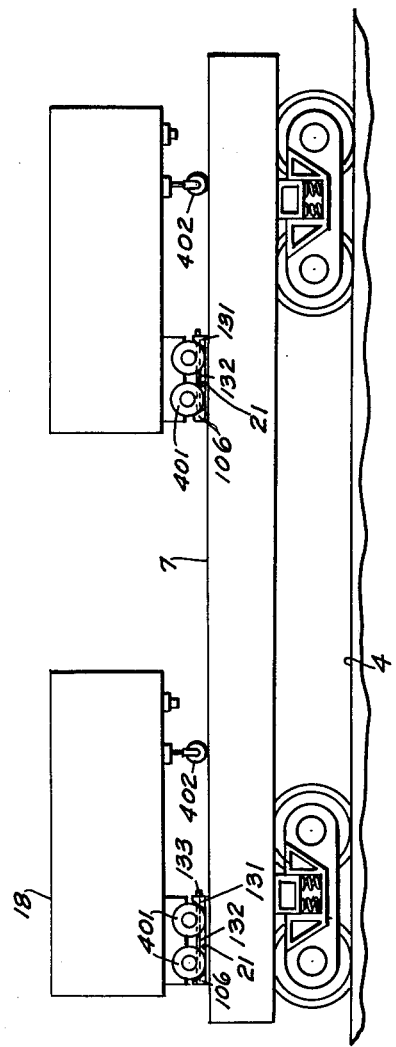
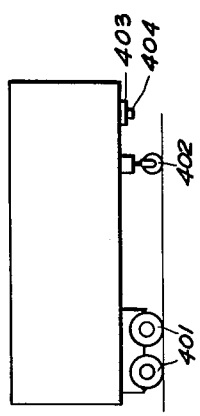
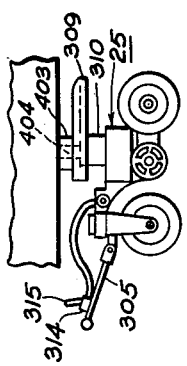
INVENTOR.
FORTUNATO S. AJERO
BY
Kegan, Bellamy & Kegan
ATTORNEYS United States Patent Office 3,074,569
Patented Jan. 22, 1963

3,074,569
SIDE-LOAD AND UNLOAD STRUCTURE FOR RAILWAY-CARRIED HIGHWAY TRAILERS
Fortunato S. Ajero, Galion, Ohio, assignor to Albert I. Kegan, trustee, Evanston, Ill.
Filed Jan. 28, 1959, Ser. No. 789,663
4 Claims. (Cl. 214—38)

This invention relates to structure for use in side loading highway trailers onto railway flatcars and in side unloading them therefrom, the trailers being of the type commonly transported over highways, or roadways, by automotive tractors. The principal object of the invention is to provide improved mobile load-unload structure which permits efficient and economical loading of highway, or roadway, trailers onto railway flatcars for transportation by rail, and permits of the efficient and economical unloading of such trailers from railway cars onto a roadway, or highway.

The structure herein disclosed may be considered as an improvement on that disclosed in my prior application for Mobile Loading Ramps, Serial No. 668,234, filed June 26, 1957 and which has issued as Patent No. 3,019,917.

As disclosed in my prior application, the usual railway flatcar is sufficiently long to accommodate at least two roadway trailers of the type commonly employed for hauling freight, being the trailer portion of the combination ordinarily termed a trailer truck, such a trailer being towed over a roadway or highway by an automotive tractor, or truck tractor.

As further pointed out in my noted prior application, the most efficient time-saving arrangement for transferring roadway trailers between a roadway and railway flatcars necessarily includes structure permitting direct access between the roadway and each flatcar of a string of railway cars deposited on a siding for loading or unloading, as distinct from certain earlier proposals of unloading or loading all of the flatcars of a string thereof in tandem, as over a sloping ramp or other roadway connection to the end car of the string.

Briefly, the noted prior application discloses side load-unload apparatus comprising a mobile roadway-supported structure having an angular platform to abut and align with one side (such as the right side) of a flatcar and carrying a raisable and lowerable ramp for bridging between the mobile platform and the roadway.

According to this invention, the mobile load-unload structure comprises a platform which can be moved alongside either side of a railway flatcar, between the flatcar and the roadway, and has a raisable and lowerable ramp carried on a turntable located at one end of the mobile platform structure and turnable to either side according to the direction (left or right) from the flatcar to the adjoining roadway. Thereby, the mobile load-unload structure is capable of use in connection with any section or siding of railway adjoined by a roadway, whether the adjoining roadway is on the right or on the left of the siding or section.

Further, according to the invention, the mobile platform structure carrying the adjustable roadway-contacting ramp, is capable of normal transportation, as along a roadway or railway, since the noted turntable arrangement permits the ramp to be retracted from either its left or its right position to an intermediate position behind the line of travel.

According to a further feature, the mobile platform is arranged to carry a locally usable dolly tractor (in simple tricycle form as disclosed) for lifting and supporting the front end of any trailer being loaded or unloaded, and for carrying the front end of the trailer in a turning movement about the rear wheels of the trailer. Such rear wheels are then resting on a flatcar-supported turntable, and the trailer is turned between a position aligned with the ramp and a position aligned with the flatcar. Using a local dolly tractor with a lift avoids the former necessity of special steerable front landing wheels for the trailers, along with special pushing or pulling apparatus to turn the trailer between its noted alignment positions.

According to related features, the noted local tractor dolly is cable-connected to receive operating power from the parent vehicle; is steerable manually from an operator walking or standing on the parent vehicle or on the adjoining flatcar; and carries its own local control apparatus through which its power and driving functions are controlled.

According to a further feature, a railway flatcar is adapted for efficient use with the structure for side loading and unloading by having a pair of sturdy stop members or chock blocks positioned thereon and extending across the rear portion of each turntable on the flatcar to stoppingly engage both rear wheels of a slowly backing trailer when the correct position thereof on the flatcar has been reached during a loading operation. In connection with this feature, the turntable is rotatable between right and left positions for receiving trailers from corresponding directions.

According to a further feature, each noted turntable has a forward, or neutral, position in which the flatcar on which is it mounted is adapted for the previously noted end loading and unloading for which some railway terminals are equipped. For that purpose, the two noted chock-block members are unlocked from their normal position and are rotated to a new locked position wherein they are disposed along the center of the turntable to allow the wheels of trailers and of their automotive tractors to pass along the two sides of them.

The above-mentioned and other features and objects of this invention and the manner of attaining them will become more apparent and the invention itself will be best understood, by reference to the following description of an embodiment of the invention taken in conjunction with the accompanying drawings, comprising FIGS. 1 to 11, wherein:

FIG. 1 shows railway-siding and roadway sections in relationships respectively for right-hand and left-hand load-unload operations;

FIG. 2 is an enlarged top view, partly broken away, of a railway flatcar 7 and the adjoining mobile load-unload structure 10 of FIG. 1, with the adjustable ramp of the load-unload structure retracted to its neutral or transportation position;

FIG. 3 is a top sectional view of the load-unload structure of FIG. 2, taken along line 3—3 of FIG. 4;

FIG. 4 is a side view, partly in section, of the load-unload structure of FIGS. 2 and 3;

FIG. 5 is an end view of the load-unload structure of FIGS. 2 to 4;

FIG. 6 is a partly sectioned fragmentary side view of flatcar 7 of FIG. 2, showing one of its turntables 21 in its intermediate position and with its chock bar 104 in its adjusted crosswise position;

FIG. 7 is a fragmentary view looking up along line 7—7 of FIG. 6;

FIG. 8 is a fragmentary view of the front end of trailer 18 of FIG. 8 raised and supported by the local dolly tractor;

FIG. 9 is a side view of the trailer 18 of FIGS. 1 and 8 resting on its front landing wheels;

FIG. 10 is a side view of the trailer 18 of FIGS. 8 and 9 in the dolly-supported position of FIG.8; and FIG. 11 is a side view of flatcar 7 of FIGS. 1 and 2 loaded with trailers 18 and 19.

General Arrangement

Referring now to the drawings, it has been chosen to illustrate the invention as applied to a mobile load-unload structure (as shown at 10 in FIGS. 1 to 5 and at 11 in FIG. 1) provided with flanged wheels for operating as an item of railway rolling stock. In FIGS. 3 to 5, it is shown supported on rails 4 by two sets of wheels 210 in a double-truck arrangement common to railway vehicles. The load-unload structure operates along a railway siding located between the adjoining service roadway and a siding such as 3 on which cars or trains of cars may be located for loading and unloading. The adjoining railway sidings being on a common level, the flat top of the load-unload structure is of such a height above the support rails as to be level with the top of the flatcars, permitting easy transfer of vehicles from one to the other and without requiring the raising, lowering, or leveling required of the load-unload structure when it is constructed as a roadway or highway vehicle.

FIG. 1 shows right-hand and left-hand siding locations along railway line 2. At the right-hand location, sidings 3 and 4 are reached from the main line by the usual railway switching operations. Siding 3 is assumed to be the one along which cars to be loaded or unloaded are placed, of which flatcar 7 is shown. The outer siding 4, adjacent to the illustrated roadway 12 is used primarily by the load-unload vehicle 10.

At the left-hand siding location, sidings 5 and 6 and roadway 13 correspond to 3, 4 and 12. Items 8 and 11 may be similar respectively to items 7 and 10.

It will be observed that each of the flatcars 7 and 8 is provided with two turntables 21 for supporting the rear wheels of respective roadway trailers (such as 14, 15, and 18) to facilitate swinging the front end of any such trailer between a diagonal load-unload position and an aligned transit position, through the use of local tractor or powered dolly 25.

Each of the load-unload vehicles 10 and 11 is provided with a swingable ramp 203, raisable and lowerable by being pivoted horizontally to turntable 202, carried on its load-unload vehicle and pivoted vertically at 204. The ramp is illustrated as swung to the right for right-hand operations at vehicle 10, and swung to the left for left-hand operations at vehicle 11. As shown in FIG. 2, the ramp 203 may be swung to a neutral position for in-line travel along the siding on which the vehicle is located or along the main line from one siding location to another.

Referring further to the vehicles at the left-hand siding location of FIG. 1, flatcar 8 is shown with roadway trailer 14 loaded on the front section thereof, the rear wheels of trailer 14 resting on the front turntable 21 of flatcar 8. Load-unload vehicle 11 is shown positioned in association with the rear loading section of flatcar 8, with ramp 203 swung to the left and lowered to the surface of roadway 13 in alignment with rear turntable 21 of flatcar 8. Further, roadway trailer 15 is shown being pulled by roadway tractor 16 forwardly toward a location from which it can be loaded on the rear section of flatcar 8. For this purpose, trailer 15 is pulled forwardly along the illustrated dotted-line path to a point forward of ramp 203 of 11, following which it is backed slowly onto and up ramp 203, across a portion of vehicle 11, and thence onto flatcar 8 until the rear wheels of trailer 15 come upon rear turntable 21 of 8 and are stopped by the chock bars along the rear side of the turntable. Then the brakes (not shown) of the partially loaded trailer 15 are set and the tractor 16 is disconnected, leaving trailer 16 resting on its front landing wheels (such as 402, FIG. 9 or 10) in a load-unload position (not shown) wherein the trailer is at the same acute angle to the flatcar as is the ramp 203 of 11. The tractor 16 may now be driven off ramp 203 onto roadway 13, as to couple onto another roadway trailer to be loaded on another flatcar (not shown) on siding 5.

The front end of the semi-loaded trailer 15, brought to its noted angular load-unload position as described, is now raised by the associated local tractor 25 as hereinafter described and is propelled along the path of the curved arrow 28 until trailer 15 reaches its railway-transit position, aligned with car 8 as shown for trailer 14. Then, the tractor 25 lowers trailer 15 until its front wheels rest on the flatcar as shown at 402 for trailer 18 (FIG. 11), following which tractor 25 of vehicle 11 is returned to its idle position shown in FIG. 1.

Load-unload vehicle 11 may now be moved along siding 5 to another flatcar (not shown) to be loaded or unloaded. Ramp 203 may first be raised from contact with roadway 13 and swung to the in-line position shown in FIG. 2 for vehicle 10, the raising and swinging operations being performed as hereinafter described. When the new location in association either with the front position or the rear position of the last noted flatcar is reached, vehicle 11 is stoped and its ramp 203 is again brought to its left-hand lowered position shown in the drawing.

Referring to the right-hand sidings 3 and 4 and roadway section 12 as shown in FIG. 1, the illustration of roadway tractor 17 and roadway trailer 18 may be taken as when the vehicles are being backed onto the right-hand-located and lowered ramp 203 of vehicle 10 until the rear wheels of trailer 18 pass slowly over vehicle 10 and onto flatcar 7 and are stopped by the chock blocks at the rear side of rear turntable 21 of car 7. Then, operations as described in connection with vehicles 8 and 11 and trailer 15 may occur, including the driving of roadway tractor 17 off the vehicle 10 and ramp 203 for further use, and the use of local tractor 25 of vehicle 10 to swing the front end of the partially loaded trailer 18 along the curved path indicated by arrow 29 to an in-line railway-transit position, following which tractor 25 of 10 is returned to its illustrated idle position.

Vehicle 10 may now be advanced along flatcar 7 to position it for loading a trailer such as 19 of FIG. 11 in the front loading position of car 7, following which such trailer may be loaded as described for the loading of trailer 18.

When a trailer located on a flatcar such as 7 is to be unloaded, as when such a flatcar has been received on siding 3 loaded with trailers for local delivery, the steps are the reverse of those described for the loading operations. That is, with vehicle 10 positioned as shown in load-unload association with a trailer position on flatcar 7, local dolly 25 of 10 is employed to raise the front end of the loaded trailer off its landing wheels and swing it to an angular position in alignment with the lowered and positioned ramp 203. The partially unloaded trailer may then be lowered to its landing wheels as hereinafter described, and local tractor 25 may be returned to its idle position. Then, a roadway tractor such as 17 can be backed up the ramp and onto vehicle 10 to raise and couple onto the front end of the angularly positioned trailer, following which the trailer is moved forwardly down the ramp 203 and onto roadway section 12. For this purpose, the illustration of tractor 17 and trailer 18 in FIG. 1 may be considered to be that of completing the described unloading of trailer 18 from car 7 by bringing it onto roadway section 12.

Turntable Construction

Referring particularly to FIGS. 2, 6, and 7, the construction of turntables 21 will be described, being the turntables of which two are provided for each of the illustrated flatcars on the basis that such a standard flatcar will hold two normal-length highway freight trailers but will not hold three.

Referring to the front turntable 21 of car 7 as shown in FIG. 2, two dotted-line segments indicate the general circular nature of the turntable despite its rear corner portions 103, 104, provided to support chock blocks 105 and 106 when they are used for the side loading and unloading operations herein described. It will be observed that the chock blocks 105 and 106 on this turntable are shown rotated forwardly about their respective pivot pins 107, 108 to bring them to the center of the turntable and that the turntable is shown in its neutral position, with its locating pin 102 in the center one of the three locking openings 22 in the top surface of flatcar 7. Blocks 105 and 106 are retained locked in central position by lock pins 109, 110 resting in open slots 114 in the center-lock bracket 113. When, as occasionally happens, a series of flatcars such as 7 are to be loaded or unloaded from a siding which has only an end ramp and has no provisions for flexible side loading according to this invention, all such trailer-carrying flatcars must be bunched together and pushed up to the end loading ramp (not shown). Moreover, the turntables 21 of all of the flatcars except the rear turntable 21 of the car farthest away from the end loading ramp are turned to the position shown for the front turntable 21 to permit the wheels of the highway trailers and tractors to pass alongside of the chock blocks 105 and 106 incident to the end loading or unloading.

When the front turntable of car 7 is to be returned to its normal intended use, the front end of each of the chock blocks 105, 106 is raised slightly to clear their lock pins from slots 114 of bracket 113. Blocks 105 and 106 are lifted at the front and are swung outwardly and rearwardly to an aligned position shown for 106 of the rear turntable of flatcar 7. In this position, pins 109 and 110 are dropped into lock slots 114 or rear lock brackets 111, 112. To facilitate the described locking and unlocking of the chock blocks 105, 106, they are preferably somewhat loosely mounted on their pivot studs 107, 108 to permit the desired slight vertical movement of the non-pivoted end.

Each of the turntables 21 is provided with a forward lug 101 having a vertical opening therethrough to receive pin 102 of FIGS. 2 and 6 to lock the turntable in any one of its three positions when the pin is dropped into the corresponding one of the three openings 22 provided in the flatcar surface for each of the turntables.

As shown best in FIGS. 6 and 7, each turntable 21 is supported and strengthened by a number of integral spoke-like ribs 118 which extend between the hub portion of the turntable and a depending rim 117. The hub portion carries a bolt-like pivot pin 119 on which is mounted a conical thrust-bearing member 120 which is received on roller bearings 134 contained within bearing housing 121, supported on stationary hub 122. The stationary support structure comprises a rim 124 secured around circular opening 116 within which rim 117 of the turntable is received. Support rim 124 is connected with support hub 122 by a number of support spokes 123. The principal weight placed on turntable 21 is supported on a series of rollers 125 carried on pins 126 extending through stationary support rim 124. The undersurface of rim 117 is thus rollingly supported at six or more points, as desired.

When a turntable 21 is brought either to its right-hand or to its left-hand position to receive a trailer to be loaded, it may be locked in the position by inserting its pin 102 through portion 101 into the underlying opening 22 which extends through the surface member of the flatcar and into the top wall of the underlying stationary support rim 124 (FIG. 6). When the turntable is thus locked in an angular load-unload position, lock pin 102 is removed before the front end of a trailer being loaded is swung from its angular load-unload position to its aligned railway-transit position as described. The turntable is thereby freed to be returned to its intermediate or in-line position by the swinging of the trailer. Lock pin 102 is preferably inserted to lock the turntable in intermediate position while the trailer being loaded is still supported on local tractor 25, which may be used to swing the trailer slightly forward or back to permit the lock pin to be placed in the central one of the three lock openings 22 associated with any turntable.

*Construction of Load-Unload Vehicle*

Referring particularly to FIGS. 2 to 5, which show respectively a top view, a top sectional view, a right-side view partly in section, and an end view, the construction of the load-unload vehicle 10 will be described, vehicle 11 shown in FIG. 1 being of the same construction as vehicle 10.

Vehicle 10 is supported on front and rear trucks of the general type common in railway rolling stock, each truck being supported by four flanged wheels 210, supported on railroad rails such as the rails of siding 4. The two 4-wheel trucks support the platform body 201 of vehicle 10 through I-beam cross members 211, the support being through conventional coil springs 219 and blocks 220.

As best seen in FIGS. 3 and 5, drive to vehicle 10 is supplied to the wheels of one truck by drive motors 216. Each of the drive motors drives the associated flanged wheels in the manner common to electric railway rolling stock, as by three gears on each side (not shown) contained within right and left housings 218 and comprising a small gear driven by the motor shaft and meshing with each of two larger gears fixed coaxially with the associated flanged wheels.

Power for energizing drive motors 216 is obtained from generator 215, driven as by diesel motor 212, the motor and the generator being suspended from underneath the surface of the flatcar by hangers 217, FIGS. 3 and 4. Diesel motor 212 is also arranged, as through gears (not shown) contained in housing 214, to drive hydraulic pump 213, as to power the raising and the turning of ramp 203.

Turntable 202, for supporting ramp 203, has the illustrated curved side to fit within the curved and sunken nest in the forward portion of the platform structure 201 of vehicle 10, the turntable being supported on vertical pivot pin 204 fixed therewith by a cross-pin (FIG. 4). Pin 204 extends downwardly through bearing ring 222, fixed to platform body 201. The inner end of ramp 203 is hinged to turntable 202 by horizontal pin 205 (FIGS. 2 to 4). The lower end of pin 204 fixedly carries turn ring 223 and lift bracket 208, through which the turning and lifting of ramp 203 are effected by hydraulic cylinders 206 and 209.

As seen best in FIG. 3, one end of hydraulic turn cylinder 206 is fixed with platform structure 201, and the plunger of 206 extends to and is pivoted with turn arm 207, being a rear extension of turn ring 223, fixed around pin 204. One end of each of the lift pistons 209 is pivotally fixed with lift bracket 208, fixed with pin 204 to turn with the turntable and ramp. The plungers of cylinders 209 are attached to pivot pin 224, fixedly attached to ramp 203.

The lifting and turning of ramp 203 is through hydraulic lines (not shown) supplied with hydraulic pressure from pump 213.

When turning to the right of turntable 202 and attached ramp 203 is desired, hydraulic pressure is supplied to the anchored end of cylinder 206 to act outwardly on the piston thereof (not shown) causing it to expel its plunger and thus turn arm 207 in a clockwise direction. Pivot pin 204 is thereby correspondingly turned, along with turntable 202 and attached ramp 203. Turning of the same structure to the left is accomplished by relieving the hydraulic pressure referred to above and substituting hydraulic pressure in the other end of cylinder 206 to cause retraction of the associated plunger. When the desired rotational position of the turntable and ramp are reached, the pressure is equalized between the two ends of push-pull cylinder 206.

When ramp 203 is to be raised, as from a lowered position to the transit position thereof shown in FIG. 4, hydraulic pressure is admitted to the anchored end of cylinders 209 to cause the pistons thereof (not shown) to expel their illustrated plungers, thereby acting through lift pin 224 to raise ramp 203 to the desired position. When that position is reached, a valve closure may occur to stop the flow of hydraulic fluid to the pistons, while trapping therein the hydraulic fluid already admitted.

When ramp 203 is to be lowered, after having been swung to the left or to the right to the desired angular load-unload position over a roadway section such as 12 or 13 of FIG. 1, the noted hydraulic fluid maintained in pistons 209 to hold the ramp in raised position is allowed to return, allowing the associated plungers to be retracted under the weight of the ramp until the ramp contacts the underlying roadway surface.

As shown in FIGS. 2 to 5, a sunken operator's compartment 231 is provided at the free end of platform 201, stairway 232 giving the operator access between the floor of the compartment 231 and the surface of platform 201. Two control cabinets 233, seen best in FIG. 5, are mounted within compartment 231 and are provided with control members or levers 234 through certain ones of which power connections (not shown) between generator 215 and drive motors 216 are controlled to cause backward, forward, and stopping movements of vehicle 10 to be controlled as desired. Certain other ones of the control members 234 are employed to cause the connections (not shown) between hydraulic pump 213 and pistons 209 to be controlled to carry out the described turning and the raising and lowering of ramp 203.

The platform surface of vehicle 10 is provided with a fixed guide rail or curb 240, which comprises two inwardly inclined rear sections 241 and 242 and two more sharply inclined joining front sections 243 and 244, which sections may all be welded or otherwise secured fixedly together. Rear member 241 preferably lies along the horizontal angle with respect to the sidings to which ramp 203 is turned to the right for right-hand loading or unloading (as at sidings 3, 4 of FIG. 1), and is so located on the platform surface as to form a marginal guide for the rear wheels on the adjacent side of the trailer vehicle being loaded or unloaded. Rear member 242 is similarly disposed and located with respect to left-hand loading and unloading, as at sidings 5 and 6 of FIG. 1. The sharper inward angle of front sections 243 and 244 of curb 240 insures that an adjacent wheel of a trailer being backed for loading in approximate alignment does not engage the prow of the curb, and also has some tendency to induce proper alignment of the rear end of the trailer by sideward sliding.

Vehicle 10 is further provided with a cable reel 236, journaled for rotation in bearing brackets 237, and preferably spring-biased for automatic return of cable 235 carried thereon. Cable 235 leads upwardly through hollow cable standard 238 and across play-out pulley 239 and into local dolly 25, shown in its idle right-hand position alongside curb 240. Cable 235 enters tractor dolly 25 through the left-hand one of the two bell-mouthed entrance tubes 313. Cable 235 enters on the other side of the tractor dolly, through the right-hand tube 313, when the mobile structure is positioned for left-hand load-unload operations as shown at 11 in FIG. 1. Preferably, the connections made to cable 235 at entrance tube 313 are of a suitable quick-detachable character, such as is common to inter-car railway practice.

Cable 235 includes conductors for supplying power to the tractor dolly 25 from generator 215 of the parent vehicle 10. Where a hydraulic lifting and lowering action of the tractor dolly is employed as hereinafter described, cable 235 also includes hydraulic pressure and return lines associated with hydraulic pump 213.

*Tractor Dolly 25*

Tractor dolly, or local tractor, 25 carried on load-unload vehicle 210 is normally carried in an idle out-of-the-way location at the right or at the left alongside curb 240, depending upon whether it is used on a load-unload vehicle currently at a right-hand load-unload location as shown for vehicle 10 of FIGS. 1 to 5, or at a left-hand load-unload location as shown for vehicle 11 of FIG. 1. In either position, it is connected to the parent vehicle through power cable 235 as described, that power cable entering the tractor dolly through the nearest one of the two bell-mouthed entrance tubes 313, as described.

Tractor dolly 25 is preferably of the illustrated tricycle form, having a single, steerable front wheel 301 and a pair of rear wheels 302. Front wheel 301 is carried in front fork 303, pivotally supported to frame 306 at vertical pivot member 304. Steering handle 305 is secured to fork 303 to permit the operator to steer the tractor dolly by turning front wheel 301 to the right or to the left as required. Propelling power to the rear wheels 302 is preferably provided by an electric motor (not shown) within the frame of the vehicle, through pulley 307 and drive belt 308.

Dolly 305 is surmounted by a trailer lift 309 containing a horizontal guideway leading to opening 312 for receiving the king pin of a highway trailer. Trailer lift 309 is raisable and lowerable to permit the dolly tractor to be run under a highway trailer standing on its front landing wheels, such as 402 of FIG. 9, to raise the trailer off its landing wheels and maintain it in raised position while the tractor dolly is propelled to swing the front end of the supported trailer between its described load-unload angular position and its described in-line railway-transit position. The raising and lowering of lift member 309 is accomplished through plunger 310 on which it is supported, plunger 310 perferably being controlled by a hydraulic piston (not shown) contained in cylinder structure 311 carried on vehicle 25. Raising of support structure 309 from its retracted position shown in FIG. 4 to its upwardly extended position shown in FIG. 8 is accomplished by admitting hydraulic pressure to the lower portion of cylinder 311 to cause plunger 310 to be expelled upwardly. Lowering is accomplished by disconnecting the hydraulic pressure and permitting the fluid to be slowly returned to the noted return line contained in power cable 235.

It will be understood of course that, if desired, hydraulic cylinder 311 may be replaced by an electric motor having a suitable lift and lower gear connection to plunger 310, in which case the noted hydraulic lines may be omitted from power cable 235.

The control of the application of motor power to the previously noted drive motor of vehicle 25 from power cable 235 is controlled from control box 314 through local cable 316, as is the described raising and lowering of lift member 309. Either such control is through a separate lever 315 and may be either a direct control or a relayed control, as desired.

Referring particularly to FIGS. 1 and 2, with the turntable 202 and ramp 203 of FIG. 2 turned to the right and ramp 203 lowered onto roadway 12 as shown in FIG. 1, when a trailer such as 18 is backed slowly up ramp 203 until its rear wheels 401 traverse ramp 202 and platform 201 to come onto flatcar 7 and across the rear turntable 21, the movement is stopped when the rear wheels of the trailer bump against chock blocks 105 and 106 of the turntable. At this point, the tractor vehicle is disconnected from the trailer and is driven off the ramp as described, lowering the trailer onto its landing wheels 402 (FIG. 9). Then, the king pin 404 of the trailer (FIG. 9) may occupy a position above turntable 202 as shown in FIG. 2 in dotted outline at 330. The operator of vehicle 10 (FIG. 2) may now come up steps 232 from compartment 231 onto the surface of platform 201 and apply forward power from cable 235, through control box 314 and cable 316, to wheels 204 of the tractor dolly, and steer the dolly along curved line 329 until king-pin opening 312 in lifter 309 of the tractor dolly aligns (as at dotted-line position 330) with the king pin 404 (FIG.

9) of the trailer. At that point, the movement of the tractor dolly is stopped and power is admitted as described to the lift portion thereof to raise trailer lifter 309, which acts against portion 403 (FIG. 9) to lift the landing wheels 402 off the surface of vehicle 10. When the trailer has been lifted, lock pin 102 (if in place) is removed to permit rotation of the turntable, and forward power is reapplied to wheels 302 to carry the front end of the lifted trailer along curved line 29 until the fully loaded or railway-transit position of the trailer is reached, wherein it is aligned with the flatcar as shown in FIG. 1 for trailer 14 and flatcar 8.

As the described swinging or turning movement of the trailer occurs, the turntable 21 on which its rear wheels 401 rest freely turns, causing the turntable to reach its intermediate position coincidentally with the trailer reaching its in-line position. Preferably while the tractor dolly is still maintaining the aligned trailer in its raised position, lock pin 102 is inserted in 101 to enter the center one of the three lock openings 22, shown best in FIG. 2, front turntable. The turntable is thereby locked against rotation, thus assisting in holding the loaded trailer in its in-line loaded position.

Lifter 309 of the tractor dolly is now lowered as decribed, permitting the landing wheels 102 of the loaded trailer to come to rest on the surface of flatcar 7, and freeing the king pin 404 of the trailer from its receiving opening 312 in lifter 309. The tractor dolly may now be returned in reverse direction over dotted lines 29 and 329 to its idle position illustrated in FIG. 2.

The use of tractor dolly 25 in an unloading operation is substantially the reverse of the operations described in connection with loading. That is, the tractor dolly is first advanced from its idle position illustrated in FIG. 2 onto the flatcar to engage and raise the front end of the trailer from its landing wheels, following which it pulls the front end of the trailer reversely over curved line 29 until the king pin occupies a position about as illustrated in dotted line at 330, whereupon the trailer is lowered by lowering lifter 309 to disengagement, following which the tractor dolly is returned over curved line 329 to its illustrated idle position, leaving the partially unloaded trailer to be engaged by a highway tractor such as 17 and pulled forwardly off the vehicle 10 and its ramp 203 onto roadway 12.

As previously indicated, FIG. 8 shows a somewhat enlarged front view a tractor dolly 25 holding the front end of trailer 18 in raised position, and FIG. 10 is a side view of vehicles 18 and 25 in the position of FIG. 8, showing that the landing wheels 402 are raised from the underlying surface.

FIG. 11 shows trailers 18 and 19 in loaded and preliminarily secured position on flatcar 7 of FIGS. 1 and 2, the rear wheels of the trailers resting respectively on the rear and front turntables 21 of the flatcar. In FIG. 11, the loaded trailers 18 and 19 are preliminary secured in loaded position independent of the usual rear-wheel brakes thereof, by double-chocking of their rear wheels 401 on turntables 21. The rear chocking of wheels 401 is accomplished by chock bars 105 and 106 of the turntables, and the front chocking is provided by later-placed front-chock bars 131, which are bolted to the rear chock bars 105 and 106 by long bolts 132. It will be understood, of course, that each highway trailer of the type intended to be carried on the flatcars usually has a total of eight rear wheels 401, two such wheels on each end of each of two rear axles. At each trailer, two bolts 132 (one of which is shown in dotted outline in FIG. 2) may be passed forwardly through respective openings in chock blocks 105 and 106, each bolt between the two pairs of rear tandem wheels on the associated side of the trailer, and thence through an opening in chock block 131 at the front of the foremost rear wheels on that side of the trailer, following which nuts 132 are applied and tightened to bring the front chock block 131 securely in place.

With each turntable 21 locked in its intermediate position, by the described insertion of lock pin 101 through opening 102 and into the intermediate opening 22 in the flatcar, each loaded trailer is held securely on the flatcar except for unusual jolts, against which it may be further held by such conventional tie-down means as may be desired.

While I have described above the principles of my invention in connection with specific apparatus, it is to be clearly understood that this description is made only by way of example and not as a limitation to the scope of my invention.

I claim:

1. For use in side loading road-vehicle trailers onto, and side unloading them from, railway flatcars located on a railway track, wherein the trailers are equipped with landing wheels at the front and with road-transit wheels at the rear and are detachably supported at the front on a road-vehicle tractor during road transit, the combination of: a steerable dolly tractor; mobile adapting structure on which the dolly tractor is carried, the last said structure comprising a load-unload vehicle movable along between a string of railway cars positioned along a railway section between it and an adjoining roadway section, the load-unload vehicle including means for providing a diagonal continuation of the surface of the adjoining roadway onto the surface of any said flatcar in association with which it is positioned, permitting a said trailer to be backed by a said road vehicle tractor diagonally from the roadway and diagonally over the said continuation thereof at an acute angle to the longitudinal disposition of the last said flatcar and left in a load-unload position wherein the road transit wheels of the trailer rest on the surface of the flatcar and the landing wheels rest on the surface of the load-unload vehicle, and also permitting a said trailer to be picked up and pulled by a said road vehicle tractor from the load-unload position over the said roadway continuation onto the roadway; means powering the dolly tractor to move forward and back; a lifter carried by the dolly tractor lowerable to be carried under the front end of a trailer resting on its landing wheels either in the load-unload position or in an in-line transit position on the flatcar; and power means for raising the lifter to lift the front end of a trailer and support it for a swinging movement by the dolly tractor between the said load-unload and transit positions, the last said power means being effective to lower the lifter to let down the front end of a trailer supported thereby.

2. Apparatus of the character described adapted to transfer roadway trailers detachably connected to roadway tractors between a roadway section and the surface of railway flatcars located on and along a paralleling section of railway track, by moving a roadway trailer between a roadway section position, wherein the roadway trailer is aligned with the roadway section, to a diagonal load-unload position, wherein the roadway trailer is diagonally disposed to the parallel roadway section and railway track, and then to a railway transit position, wherein the roadway trailer is aligned with the railway track, which comprises: a load-unload vehicle; means for positioning the vehicle along the flatcars between any desired one of them and the roadway section, the load-unload vehicle comprising: a platform which is generally level with the surface of any said flatcar alongside of which the vehicle is positioned; a ramp; and means for positioning the ramp with respect to the roadway to provide a continuation of the roadway upwardly and diagonally therefrom, diagonally across the platform, and diagonally onto the surface of the last said flatcar, thereby permitting a roadway trailer to be moved by a roadway tractor diagonally between the roadway and a diagonal load-unload position wherein the rear end of the trailer rests on the surface of the last said flatcar and the front end of the trailer rests on the surface of the platform; a dolly tractor normally supported on the surface of the platform alongside said diagonal roadway continuation and on the side thereof most remote from the said section of railway track; and means powering the dolly tractor to lift and to lower the front end of a said trailer and to move itself and the lifted front end of the trailer generally at right angles to the longitudinal axis of the trailer along a path across the surface of said platform and of the last said flatcar between said diagonal load-unload position of the trailer and a railway-transit position thereof wherein the trailer is aligned with the last said flatcar and is entirely supported on the surface thereof.

3. Apparatus according to claim 2, wherein the said load-unload vehicle is an item of railway rolling stock carried on a second railway section lying between the said roadway section and the said railway section on which the said flatcars are located.

4. Apparatus according to claim 2, wherein the said load-unload vehicle is self powered to effect the said positioning thereof along the said flatcars and to effect the said positioning of the said ramp, and wherein the apparatus further comprises means including a power cable extending from the load-unload vehicle to the said dolly tractor to power the dolly truck from the load-unload vehicle to effect the said lifting, lowering, and self-movement operations of the dolly tractor.

References Cited in the file of this patent
UNITED STATES PATENTS

| | | |
|---|---|---|
| 1,271,812 | Wagner | July 9, 1918 |
| 1,433,884 | Frost | Oct. 31, 1922 |
| 1,723,885 | Patterson | Aug. 6, 1929 |
| 1,734,303 | Ross | Nov. 5, 1929 |
| 1,968,196 | Francis | July 31, 1934 |
| 2,246,543 | Smith | June 24, 1941 |
| 2,338,704 | Clarkson et al. | Jan. 11, 1944 |
| 2,688,761 | Good et al. | Sept. 14, 1954 |
| 2,782,054 | Nelson | Feb. 19, 1957 |
| 2,782,733 | Ewing | Feb. 26, 1957 |
| 2,786,590 | Edwards et al. | Mar. 26, 1957 |
| 2,837,226 | Gutridge | June 3, 1958 |
| 2,867,451 | Repke | Jan. 6, 1959 |